(12) United States Patent
Duerksen et al.

(10) Patent No.: US 8,668,372 B2
(45) Date of Patent: Mar. 11, 2014

(54) TRANSPARENT ILLUMINATION PANELS

(75) Inventors: Gary Lynn Duerksen, Ward, CO (US); Seth Adrian Miller, Englewood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/640,797

(22) PCT Filed: May 11, 2012

(86) PCT No.: PCT/US2012/037535
§ 371 (c)(1),
(2), (4) Date: Oct. 12, 2012

(87) PCT Pub. No.: WO2013/169266
PCT Pub. Date: Nov. 14, 2013

(65) Prior Publication Data
US 2013/0301300 A1    Nov. 14, 2013

(51) Int. Cl.
F21V 7/04    (2006.01)

(52) U.S. Cl.
USPC ........... 362/629; 362/129; 362/130; 362/131; 362/615

(58) Field of Classification Search
USPC ................. 362/629, 618, 624; 385/129–131
See application file for complete search history.

(56) References Cited

U.S. PATENT DOCUMENTS

| | | | |
|---|---|---|---|
| 4,715,672 A | 12/1987 | Duguay et al. | |
| 5,499,165 A | 3/1996 | Holmes, Jr. | |
| 6,447,134 B1 * | 9/2002 | Takahashi et al. | 362/618 |
| 6,767,106 B2 | 7/2004 | Barnes et al. | |
| 8,152,348 B2 * | 4/2012 | Kanade et al. | 362/607 |
| 2002/0001188 A1 | 1/2002 | Barnes et al. | |
| 2008/0094854 A1 | 4/2008 | Coleman et al. | |
| 2012/0287677 A1 * | 11/2012 | Wheatley et al. | 362/627 |

FOREIGN PATENT DOCUMENTS

| | | |
|---|---|---|
| AU | 6709786 A | 7/1987 |
| AU | 576690 B2 | 9/1988 |
| AU | 4170201 A | 11/2001 |
| CA | 1268363 A | 5/1990 |
| DK | 3487 A | 7/1987 |
| EP | 0228886 B1 | 4/1993 |
| JP | 62229106 A | 10/1987 |
| JP | 2677353 B2 | 11/1997 |
| KR | 940008670 B1 | 9/1994 |
| WO | WO 01/86199 A1 | 11/2001 |

OTHER PUBLICATIONS

International Search Report and Written Opinion for PCT/US2012/037535 dated Jun. 29, 2012.
Duguay et al., Antiresonant reflecting optical waveguides in SiO$_2$-Si multilayer structures, *Appl. Phys. Lett.* (1986), 49(13):13-15 (Abstract).

(Continued)

*Primary Examiner* — Robert May
(74) *Attorney, Agent, or Firm* — Pepper Hamilton LLP

(57) ABSTRACT

Windows, or other types of transparent materials, may be constructed to passively allow light from alternate sources to pass therethrough, while also being able to actively produce artificial light for providing illumination from one side of the window by means of an incorporated optical waveguide that accepts light from an edge of the window and disperses it from only one side of the window.

23 Claims, 3 Drawing Sheets

(56) References Cited

OTHER PUBLICATIONS

DuPont Teflon AF: Amorphous Fluoropolymers, www.teflon.com (2010).

Kubica, A rigorous design method for antiresonant reflecting optical waveguides, *Photonics Technology Letters*, IEEE (Dec. 1994), 6(12):1460-1462 (Abstract).

Tokai Optical Co., Ltd., http://www.tokai.com/en/product.php (Printed from Internet Sep. 19, 2012).

* cited by examiner

TRANSPARENT ILLUMINATION PANELS

CLAIM OF PRIORITY

This application is a U.S. national stage filing under 35 U.S.C. §371 of International Application No. PCT/US2012/037535, filed 11 May 2012 entitled "Transparent Illumination Panels," the disclosure of which is incorporated by reference in its entirety.

BACKGROUND

The manner of lighting interior spaces has traditionally been dictated by the form of the illumination source, which in turn is constrained by the method of producing light. The evolution of lighting sources provides a static, fixture-based approach to lighting. This fixture-based approach to lighting suffers numerous shortcomings Light fixtures can typically be high intensity sources that cannot be viewed directly, and such lights can cast a harsh, non-uniform light throughout a room.

One newer type of lighting uses a uniform lighting material, such as an OLED sheet, to cast a more natural, diffused light into a room. However, implementing this approach can require rethinking of lighting design to account for potential interference with building architecture, furniture, and added decorations such as framed art, etc. For such lighting as OLED, the deployment of distributed lighting sources on non-traditional surfaces presents a challenge that can limit customer acceptance.

Another primary source of lighting that is prevalent in buildings are windows. Windows provide solid, weather-proof means for allowing natural light to enter and illuminate the interior of buildings. During the day, windows are the ideal source of room light, providing illumination far superior in brightness, uniformity and color quality to artificial light. However, existing windows typically can only provide sufficient light during the day when sufficient sunlight is available, and usually only to rooms adjacent to an exterior surface of a building.

It is conceivable to provide an artificial light source on the outside of a window so that a window may provide natural lighting during the day and artificial lighting when supplemental lighting is needed, such as at night or on cloudy days. Such an approach would allow for consistency and economy of lighting design, insofar as rooms are generally configured to accept light from windows, and therefore, no special design concessions would be required to accommodate extra light sources. However, this approach also has a disadvantage in that a light source would then need to be positioned outside, and a portion of the window would be obstructed by the artificial light source. Thus, there remains a need for improving interior lighting without requiring intrusive interior fixtures.

SUMMARY

Presently described are transparent materials, such as sheet materials, which provide illumination by both allowing transmission of natural light and by means of a light source disposed along an edge of the transparent material. Methods for making and using such materials are also described.

In an embodiment, an illumination device includes an anti-resonant reflecting optical waveguide structure defining a first surface for being disposed adjacent a first substance, a second surface for being disposed adjacent a second substance, and a perimetrical edge. At least one light source may be positioned along at least a portion of the perimetrical edge for entry of light into the waveguide structure via the perimetrical edge. The waveguide structure includes a core material at least partially transparent and transmissive to light impinging one or more of the first surface and the second surface. The core material includes a first layer defining the first surface, a second layer defining the second surface and an anti-resonant layer disposed between the first layer and the second layers. The first layer has a refractive index greater than a refractive index of the first substance for total internal reflection at the first surface of the light entering from the perimetrical edge. The second layer has a refractive index less than a refractive index of the second substance for dispersing a portion of the light entering from the perimetrical edge through the second surface. The anti-resonant layer comprises a transparent material layer having a refractive index greater than the refractive index of both the first layer and the second layer.

In an embodiment, an anti-resonant reflecting optical waveguide structure has a first surface for being disposed adjacent a first substance, a second surface for being disposed adjacent a second substance, and a perimetrical edge configured for entry of light into the waveguide structure via the perimetrical edge. The waveguide structure includes a core material at least partially transparent and transmissive to light impinging one or more of the first surface and the second surface. The core material includes a first layer defining the first surface, a second layer defining the second surface, and an anti-resonant layer disposed between the first layer and the second layer for internally reflecting a portion of the light in the first layer. The first layer has a refractive index greater than a refractive index of the first substance for total internal reflection at the first surface of the light entering from the perimetrical edge. The second layer has a refractive index less than a refractive index of the second substance for dispersing a portion of the light entering from the perimetrical edge through the second surface. The anti-resonant layer comprises a transparent material layer having a refractive index greater than the refractive index of both the first layer and the second layer.

In an embodiment, a method of using an anti-resonant reflecting optical waveguide structure for illumination of an area is disclosed. The anti-resonant reflecting optical waveguide structure has a first surface for being disposed adjacent a first substance, a second surface for being disposed adjacent a second substance, and a perimetrical edge. The structure includes a core material at least partially transparent and transmissive to at least light impinging the first surface. The core material is configured with respect to the first and second substances to allow entry of light from an additional light source into the core material via the perimetrical edge and to disperse the light entering from the perimetrical edge outwardly from the second surface. The method includes disposing the anti-resonant reflecting optical waveguide structure with the second surface towards the area to be illuminated, providing the additional light source along at least a portion of the perimetrical edge for radiation into the perimetrical edge, and illuminating the area by providing light from the additional light source into the perimetrical edge and dispersing the light entering from the perimetrical edge outwardly from the second surface into the area to be illuminated.

In an embodiment, a method of producing an anti-resonant reflecting optical waveguide structure for use in illumination of an area with light of known wavelengths is provided. The anti-resonant reflecting optical waveguide structure includes a core composition defining a first surface for being disposed adjacent a first substance, a second surface for being disposed adjacent a second substance, and a perimetrical edge. The method includes selecting the core composition to have at least partial transparency and transmissivity to additional light impinging the first surface, the second surface, or both, configuring the core composition, with respect to the first and second substances and the wavelengths of the light, to receive the light into the core composition via the perimetrical edge and disperse the light entering from the perimetrical edge outwardly from substantially only the second surface, and forming the waveguide structure from the core composition.

DETAILED DESCRIPTION

As a way to provide natural light into a building, original windows were formed by making holes in a wall. Over time, people began to cover the holes with animal hides, cloth, or wood to provide some protection from the weather and possibly unwanted animals and insects. Such covering were typically opaque and allowed only minimal light through the covered openings. Therefore, to allow for entry of light or the closing out of the weather, coverings which could be opened or closed, in the manner of shutter, etc. were developed.

As technology progressed, windows became more translucent and transparent to thereby protect the inhabitants from the weather and allow for transmission of light for illumination. Early windows of this type include mullioned glass windows, paper windows, flattened pieces of translucent animal horn, and sheets of thinly sliced marble. Ancient Romans began using opaque flattened glass for windows, and over time transparent plate glass was developed as it is now known.

Such plate glass allows for natural interior illumination during the day by letting existing natural light pass through, but provide no illumination once the light source is no longer present. Therefore, to provide additional illumination, alternate fixture-based artificial illumination sources have been needed.

However, in accordance with embodiments herein, an essentially fully transparent window may now be constructed that incorporates a special thin optical sheet that preserves the transparency of the window, while also allowing the window to provide uniform lighting when "edge lit" by perimetrically disposed light sources. The light sources, which may be LED lights, may be mounted around the edges of the transparent panes and within a surrounding frame. Because of the configuration of the optical sheet, the light from the edges may be emitted as a uniform glow from the window from essentially only one side of the window.

Figure 1A:
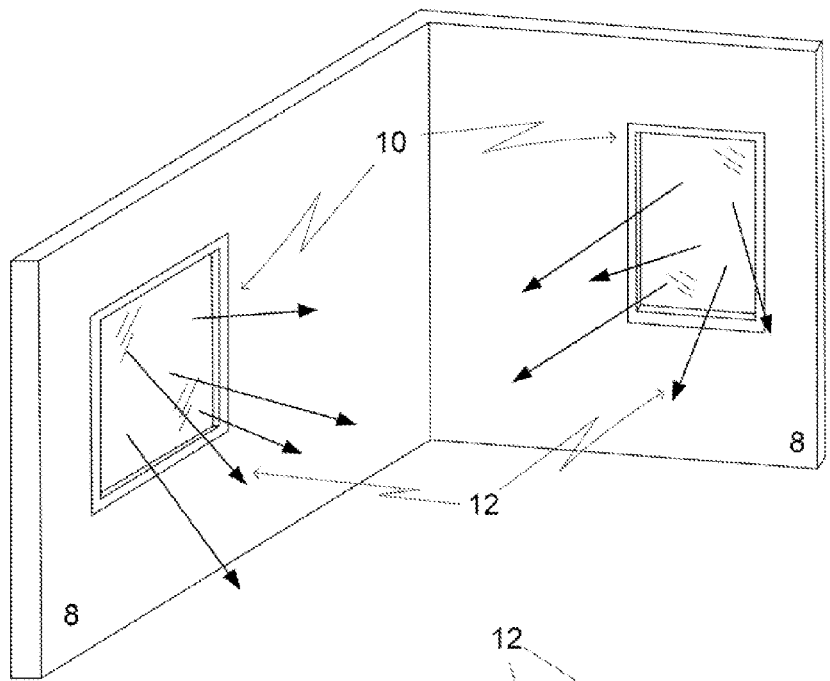
FIGS. 1A and 1B depict alternative uses for an illuminating transparent sheet according to embodiments.
Figure 1B:
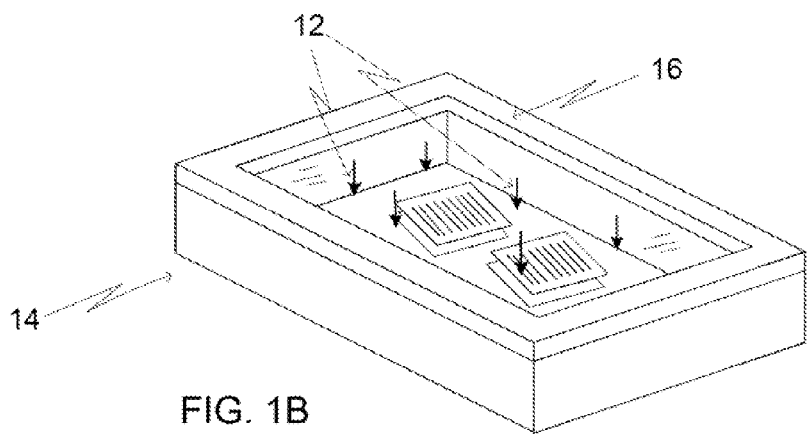

The disclosed framed transparent sheets may be used for applications where one-sided illumination may be required. Some typical applications may include, but are not limited to room lighting windows, picture frames, display cases or cabinetry, appliance windows, signage, e-readers, observation window for pressure or vacuum chambers, light sources for magnifying glasses, jeweler loupes, fresnel lenses, spectacles, borescopes, otoscopes, and peepholes. A general depiction as used for room windows and display cases is shown in FIGS. 1A and 1B. When installed in a wall 8 as shown in FIG. 1A, windows 10 may emit light (represented by rays 12) into the interior of the room when the light source is switched on. Alternatively, when used for a display case 14 as shown in FIG. 1B, the window 16 may be configured as a lid which disperses light 12 into the case interior when the light source is activated.

Figure 2:
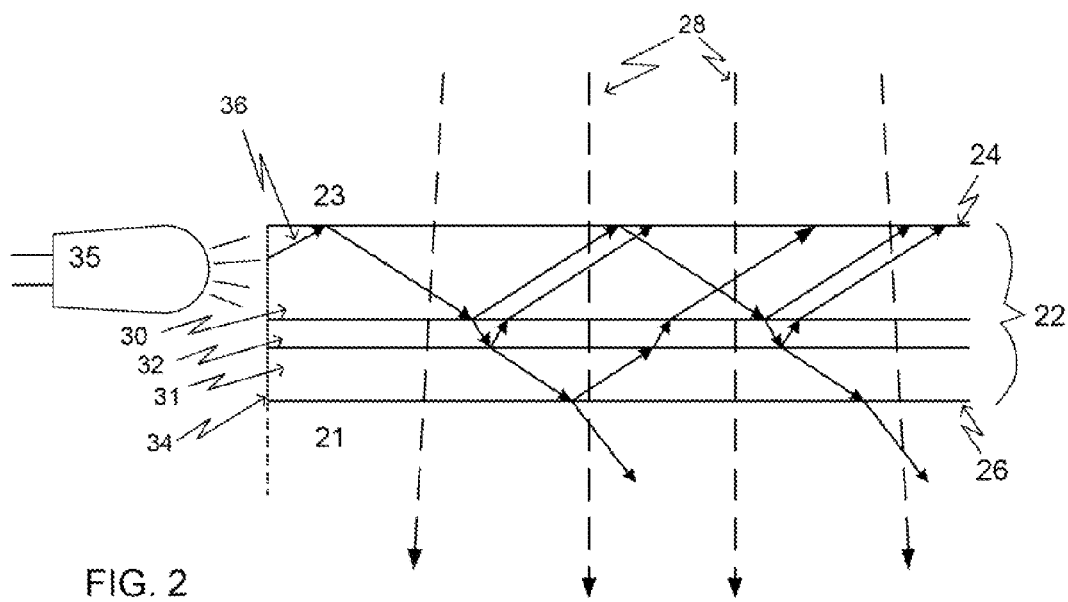
FIG. 2 depicts a cross-sectional view of an illuminating sheet according to an embodiment.

This uni-directional dispersion of light may be provided by means of a thin-film optical waveguide such as that schematically illustrated in FIG. 2. In an embodiment, a waveguide structure 20 may include a layered core material 22 that defines a first surface 24 and a second surface 26. The core material 22 may be only several micrometers thick, for example, from about 4 micrometers to about 10 micrometers, and may be configured on a substrate material 21 for structural support. The substrate material 21 may be any type of transparent material which meets the refractive index requirements, as will be discussed further below. The refractive index of the substrate may be at least about 1.5. Some examples of materials which may be used for the substrate include, but are not limited to, glass, plastic, lucite, nylon, plexiglass, aluminum oxynitride, sapphire, flint glass, thiourethane plastic, polycarbonate, crown glass, or combinations thereof. The substrate 21 may be a rigid support, a flexible support, or a support which has both rigid and flexible portions.

Similarly, the core material 22 may include any material which satisfies the refractive index requirements as set forth below, and which is transparent and transmissive to light 28 impinging one or both of the first surface 24 and the second surface 26 (FIG. 2 shows light 28 impinging only the first surface 24). The surface 24 may be disposed to air 23, or another material depending on the use.

The core material 22 may have three layers 30, 31 and 32 which define the waveguide characteristics in conjunction with the adjoining materials 21, 23. The core material 22 defines a perimetrical edge 34. By using appropriate materials and corresponding refractive indexes, the optical waveguide structure 20 may be configured as an anti-resonant reflecting optical waveguide ("ARROW"). In general, an ARROW structure is a simple planar dielectric structure that permits relatively low-loss white light propagation in low-refractive index materials. As such, when edge-illuminated by a light source 35, the entering light 36 is reflected internally and propagated within the layers as represented by the solid arrows in FIG. 2.

Some examples of light sources 35 which may be disposed about the edge of the core 22 include, but are not limited to, fluorescent bulbs, LEDs, OLEDs, PLEDs, cold-cathode fluorescent light sources, compact fluorescent light sources, halogen bulbs, mercury vapor light sources, neon gas light sources, high pressure sodium light sources, sodium vapor light sources, tungsten light sources, carbon arc light sources, electroluminescent light sources, radiofluorescent light sources, incandescent bulbs, lasers, photonic bandgap based light sources, quantum dot based light sources, hydrargyrum medium-arc iodide light sources, and combinations thereof.

In an embodiment, the light source 35 may be a source which provides a spectrum range of from about 350 nm to about 750 nm (the visible light spectrum). One example of a light source may include an LED light wherein the central wavelength of the emitted spectrum of light is about 550 nm, which is approximately the central wavelength of the visible spectrum. The light sources 35 may be mounted peripherally around the edge of the core material 22, and aligned with the core material 22 so that the light may be coupled into the ARROW waveguide. The light sources 35 may be included in a frame disposed around the core material 22, and may thus be hidden from view to provide a more aesthetically pleasing appearance.

Figure 3:
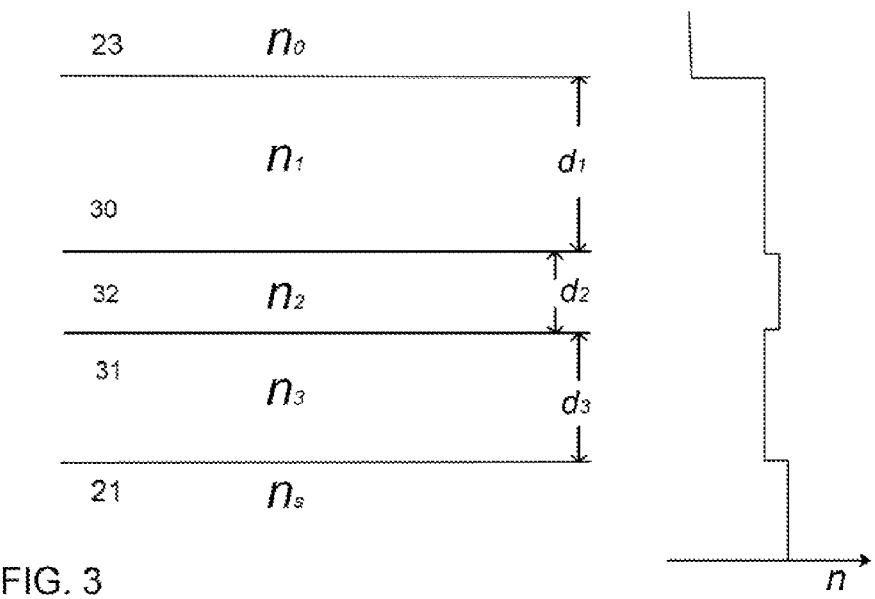
FIG. 3 shows exemplary relative refractive indexes of the various layers of an illuminating sheet according to an embodiment.

With reference to both FIG. 2 and FIG. 3, the core layer 30 has a refractive index ($n_1$) which is greater than a refractive index ($n_0$) of the material 23 for total internal reflection at the first surface 24 of the light from source 35 entering from the perimetrical edge 34. The cladding layer 31 has a refractive index ($n_3$) which is less than a refractive index ($n_s$) of the material 21 for dispersing a portion of the light entering from the perimetrical edge 34 through the second surface 26. The anti-resonant layer 32 is disposed between the layer 30 and the layer 31 for internally reflecting and propagating a portion of the light in the first layer. The anti-resonant layer 32 has a refractive index ($n_2$) which is greater than both the refractive indexes ($n_1$) and ($n_3$). A general depiction of relative refractive index values is show by the right-hand portion of FIG. 3.

In an embodiment, relative refractive index values may be as follows. A ratio of the refractive index ($n_1$) of the layer 30 to the refractive index ($n_0$) of the material 23 may be about 1.25:1 to about 1.5:1. A ratio of the refractive index ($n_3$) of the layer 31 to the refractive index ($n_s$) of the material 21 may be about 1:1.2 to about 1:1.4. A ratio of the refractive index ($n_2$) of the anti-resonant layer 32 to the refractive index ($n_1$) of the layer 30 may be about 1.2:1 to about 2.1:1. A ratio of the refractive index ($n_2$) of the anti-resonant layer 32 to the refractive index ($n_3$) of the layer 31 is about 1.2:1 to about 2.1:1.

Because of the asymmetry in the waveguide structure, light is much more strongly confined at the interface between the waveguide core layer 30 and the air than it is at the interface between the cladding layer 31 and the substrate material 21, causing the light in ARROW to leak into the substrate material 21 and be emitted from only that side of the structure.

An ARROW operates in a manner opposite that of some other waveguides. Instead of completely confining the light 36 in a high-index layer (or core), the light is confined in a low-index guiding layer by a combination of two mechanisms. The interface between the core 30 and material 23 at surface 24 reflects light 36 by conventional total internal reflection. In a manner similar to Fabry-Perot etalons (two opposing reflecting surfaces which provide multiple reflections of light between the surfaces) the anti-resonant layer 32 and cladding layer 31 act as resonant structures that reflect light back into the core except when the light satisfies a narrow resonance criterion. This anti-resonant construction permits broad spectral coverage. While the resonances of a Fabry-Perot etalon are spectrally very narrow, the antiresonant spectral regions between the resonances are very broad. Thus, the ARROW structure is able to guide white light, which is critical for general illumination, and when used in the manner as described herein, an ARROW structure may be used for illumination applications.

When such ARROW layers are disposed on a high-index substrate 21, the high refractive index of the substrate results in a leaky character of all guided-waves. However, when the parameters of the Fabry-Perot resonators formed in the cladding layers satisfy antiresonant conditions, one of the leaky waves, known as the ARROW mode, is confined to the lower-index core layer and propagates with relatively low losses. Using the approximate formula:

$$\theta_1 = \cos^{-1}(\lambda/2n_1 d_1)$$

for the propagation angle in the core, the approximate formula for antiresonant thicknesses of the layers may be determined using the following equations:

$$d_2 \approx \frac{\lambda}{4n_2}\left(1 - \left(\frac{n_1}{n_2}\right)^2 + \left(\frac{\lambda}{2n_2 d_1}\right)^2\right)^{-1/2}$$

$$d_3 \approx \frac{\lambda}{4n_3}\left(1 - \left(\frac{n_1}{n_3}\right)^2 + \left(\frac{\lambda}{2n_3 d_1}\right)^2\right)^{-1/2}$$

where $\lambda$ is a central wavelength of the spectrum of light from the light source and $d_1 > \lambda/n_1$. When $n_1 = n_3$, $d_1 \approx 2d_3$. The choice of $d_1$ may be relatively arbitrary as long as $d_1 > \lambda/n_1$, whereas the dimensions of $d_2$ and $d_3$ are determined by the anti-resonance requirement. Typically, $d_1$ is chosen as roughly 10×$\lambda$.

In an embodiment, the layer 30 may be formed from a transparent material having a refractive index ($n_1$) of about 1.25 to about 1.5. The layer 31 may be formed from a transparent material having a refractive index ($n_3$) of about 1.25 to about 1.5. The anti-resonance layer 32 may be formed from a transparent material having a refractive index ($n_2$) of about 1.5 to about 2.6.

In an embodiment, the layer 30 and the layer 31 may have the same refractive index ($n_1 = n_3$). In another embodiment, if the layer 30 and the layer 31 have the same refractive index, layer 30 and layer 31 may be formed from the same transparent material. Both the layer 30 and the layer 31 may be formed from a low-index metal composite, a low-index polymer or combinations thereof. The layer 30 and the layer 31 may be formed from the same material, or different ones of the low-index metal composite, the low-index polymer or combinations thereof.

In an embodiment, one example of a transparent material which may be used for the layer 30 and/or the layer 31 may be a fluoropolymer having a refractive index of about 1.25 to about 1.40. Some examples of fluoropolymers which may be used for the layer 30 and/or the layer 31 include, but are not limited to, hexafluoropropylene, vinylidene fluoride, perfluoroalkoxy, fluorinated ethylene propylene, and combinations thereof.

In an alternative embodiment, one example of a transparent material which may be used for the layer 30 and/or the layer 31 may be a fluorinated metal having a refractive index of about 1.37 to about 1.45. Some examples of fluorinated metals which may be used for the layer 30 and/or the layer 31 include, but are not limited to, $MgF_2$, $CaF_2$, and combinations thereof.

The anti-resonant layer 32 may be formed from a transparent material such as a high-index metal oxide or a high-index polymer. In an embodiment, one example of a transparent material which may be used for the layer 32 may be a high-index metal oxide having a refractive index from about 1.7 to about 2.6. Some examples of high-index metal oxides which may be used for the layer 32 include, but are not limited to, $TiO_2$, $HfO_2$, $Ta_2O_5$, $Nb_2O_5$, and combinations thereof.

In an alternate embodiment, a transparent material which may be used for the layer 32 may be a high-index polymer having a refractive index from about 1.6 to about 1.76. Some examples of high-index polymers which may be used for the layer 32 include, but are not limited to, one or more thiourethane, one or more polythione, one or more polysulfone and combinations thereof. The transparent material for the layer 32 may be an optical polymer having a refractive index from about 1.7 to about 1.76. Some examples of optical polymers which may be used include Tokai 1.7, MR-174, and Hoya EYRY.

In an embodiment, one method for making such an ARROW structure may include selecting materials for the core 22 so that the core is at least partially transparent and transmissive to light 28 impinging one or more of surface 24 and surface 26, and configuring the core composition, with respect to the substances 21, 23 and the wavelengths of the edge light 35, to receive the edge light 36 into the core composition via the perimetrical edge 34 and to disperse the light entering from the perimetrical edge outwardly from substantially only the surface 26.

Since the core 22 may be only several micrometers thick, the core composition may be deposited on a support structure or material 21 so that the surface 26 of the core 22 is in contact with the support structure. The material 21 may be glass, or plastic, or any of the materials as previously described, and may be rigid or flexible. The material 21 may be flat sheets or curved sheets, or may have both regions which are flat and regions which are curved.

The materials for the core 22 may be chosen and configured such that a first core material forming the layer 30 defines the first surface 24 and has a refractive index ($n_1$) which is greater than a refractive index ($n_0$) of the first substance 23 to allow for total internal reflection at the first surface 24 of the light 36 entering from the perimetrical edge 34. A second core material may be chosen for the anti-resonant layer 32 to have a refractive index ($n_2$) greater than the refractive indexes ($n_1$) of the first core material. A third core material may be chosen to form the layer 31, define the second surface 26, and have a refractive index ($n_3$) which is less than a refractive index ($n_2$) of the second core material and less than a refractive index ($n_s$) of the second substance 21 for the outward dispersing of the light 36 entering from the perimetrical edge 34.

In an embodiment, the first core material and the third core material may be chosen and configured such that the first core material and the third core material are the same material. The material may be a low-index metal composite, a low-index polymer or combinations thereof and the material may have a refractive index of about 1.25 to about 1.44. The second core material may be a high-index metal oxide, a high-index polymer or combinations thereof, and may be chosen such that its refractive index is from about 1.7 to about 2.5.

The thickness of each of the layers 30, 31, 32 may be determined as follows based on the refractive indexes and the wavelength of the light to be used:

$$d_1 \approx 10\lambda$$
$$d_2 \approx \frac{\lambda}{4n_2}\left(1 - \left(\frac{n_1}{n_2}\right)^2 + \left(\frac{\lambda}{2n_2 d_1}\right)^2\right)^{-1/2}$$
$$d_3 \approx \frac{\lambda}{4n_3}\left(1 - \left(\frac{n_1}{n_3}\right)^2 + \left(\frac{\lambda}{2n_3 d_1}\right)^2\right)^{-1/2}$$

where:
$\lambda$ is a central wavelength of the light 36,
$n_1$, $n_2$, $n_3$ are the refractive indexes of the first core material, the second core material and the third core material, respectively,
$d_1$, $d_2$, $d_3$, are thicknesses of the first core material, the second core material and the third core material, respectively, and $d_1 > \lambda/n_1$.

Once appropriate thicknesses are determined, the structure may be formed by depositing a thickness, $d_3$, of the third core material on the substrate 21 to form the layer 31, depositing a thickness, $d_2$, of the second core material on the third core material to form the layer 32, and depositing a thickness, $d_1$, of the first core material on the second core material to form the layer 30.

In an embodiment, the first core material may be $MgF_2$, $CaF_2$, or combinations thereof and the first core material may have a refractive index of about 1.37 to about 1.44. The second core material may be $TiO_2$, $HfO_2$, $Ta_2O_5$, $Nb_2O_5$, or combinations thereof and the second core material may have a refractive index from about 1.7 to about 2.5. The third core material may be $MgF_2$, $CaF_2$, or combinations thereof and the third core material may have a refractive index of about 1.37 to about 1.44. These materials may be layer deposited by physical vapor deposition, chemical vapor deposition, plasma-enhanced chemical vapor deposition, ion beam sputtering, atomic layer deposition, molecular layer deposition or combinations thereof.

In another embodiment, the first core material may be hexafluoropropylene, vinylidene fluoride, perfluoroalkoxy, fluorinated ethylene propylene or combinations thereof, and the first core material may have a refractive index of about 1.28 to about 1.4. The second core material may be one or more thiourethane, one or more polythione, one or more polysulfone or combinations thereof, and the second core material may have a refractive index of about 1.6 to about 1.76. The third core material may be hexafluoropropylene, vinylidene fluoride, perfluoroalkoxy, fluorinated ethylene propylene or combinations thereof and the third core material may have a refractive index of about 1.28 to about 1.4. These first, second and third core materials may be deposited by cast-extrusion lamination, multilayer co-extrusion, thermal lamination and combinations thereof.

EXAMPLES

Example 1

Construction of an Illuminating Sheet

A thin waveguide sheet will be constructed from materials that are readily available and which may be inexpensively assembled. The low-index first and third core layers 30, 31 will be formed from Dupont AF 2400 fluoropolymer having a refractive index of 1.29 ($n_1$ and $n_3$). The high-index anti-resonant layer 32 will be formed from a Tokai Optical Co. Ltd. thiourethane optical polymer having a refractive index of 1.76 ($n_2$).

An LED having a central wavelength ($\lambda$) of 550 nm will be used as the edge-illuminating light source 35, and the thickness ($d_1$) of the core layer 30 will be chosen to be 4 μm. To provide the anti-resonance features in the waveguide sheet, the thicknesses ($d_2$ and $d_3$) of the second and third layers 32, 31, respectively, may be calculated using the above-listed formulas, as follows:

$$d_2 \approx \frac{550 \text{ nm}}{4(1.76)}\left(1 - \left(\frac{1.29}{1.76}\right)^2 + \left(\frac{550 \text{ nm}}{2(1.76)(4000 \text{ nm})}\right)^2\right)^{-1/2} = 115 \text{ nm}$$

$$d_3 \approx \frac{550 \text{ nm}}{4(1.29)}\left(1 - \left(\frac{1.29}{1.29}\right)^2 + \left(\frac{550 \text{ nm}}{2(1.29)(4000 \text{ nm})}\right)^2\right)^{-1/2} = 2000 \text{ nm} = 2 \text{ μm}.$$

The three layers 31, 32 and 30 will be respectively heat laminated to a glass substrate (material 21). An illuminating window pane designed to these specifications would emit edge-coupled LED light at a rate of about 0.25 dB/cm. This rate can be adjusted by varying the thickness of the ARROW layer 32 relative to the core layer 30 and cladding layers 31.

A decibel (dB) is a common measurement used in the field of electronics to determine loss or gain in a system. It is the ratio, in logarithmic form, of power levels (watts for light power) between two points, such as, for example the input from the light source 35 into the core 22 and an output from the core 22. The power formula for decibel gain is expressed as:

$$G_{(dB)}=10\times\log(\text{output power/input power})$$

Since the light power output will be less than the input light power into the system, this value will always be negative. This negative gain can be referred to as a light loss, $L_{(dB)}$:

$$L_{(dB)}=-G_{(dB)}=10\times\log(\text{input power/output power})$$

and for an ARROW device as described can be determined by measuring the input wattage from the source 35 and an output wattage at points on the surface of the glass.

Example 2

An Illuminating Window

Figure 4A:
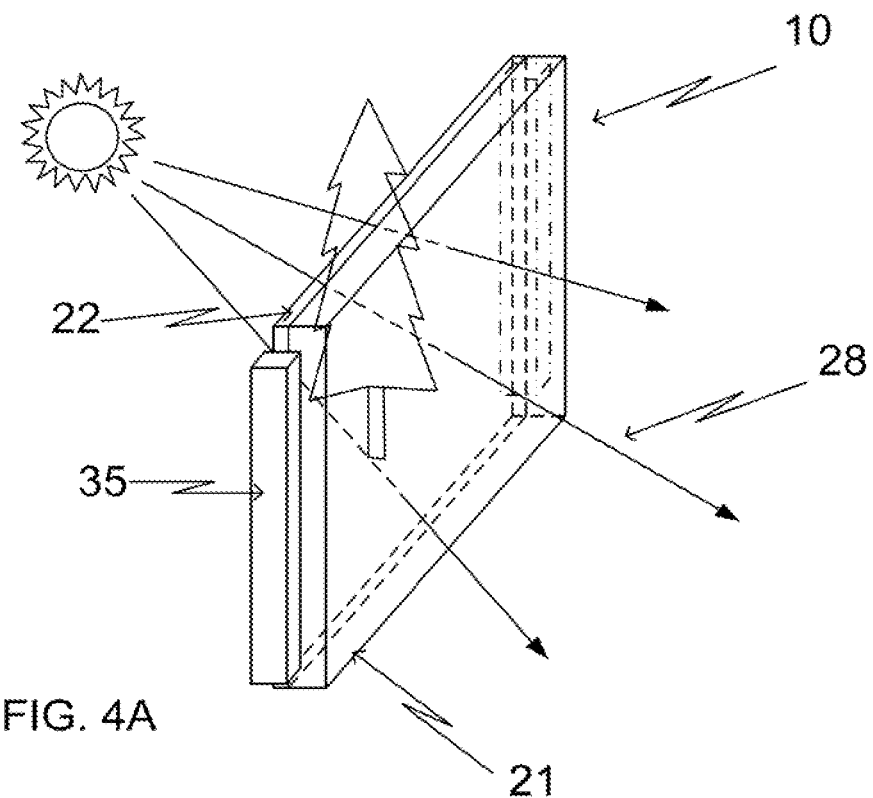
FIGS. 4A and 4B depict the functioning of an illuminating window according to an embodiment.

With the one-way dispersal of light from the sheet materials such as the configuration as provided in Example 1, a window (10 in FIGS. 1A and 4A) may allow natural daylight 28 to enter a room and also double as a uniform illumination source for lighting of a room by artificial light. For a window 10, the ARROW core material 22 may be deposited on a glass substrate material 21. Light sources 35, which may be an array of LED lights, may be disposed along the edges of the window 10 in a frame which is disposed around the window. FIG. 4A depicts lights sources 35 on two sides of the window 10, but the light sources may be disposed on any number of the sides, one, two, three, or four, etc., depending on the window shape, the size of the window, and the amount of light that the window will provide.

The lights sources 35 may be electrically connected with switches (not shown) for turning the lights on and off. One switching device may be provided for each edge, so that the amount of light coming from the window may be varied. For example, a user may turn on lights along each edge for maximum output of light, or may turn on lights along three edges for a reduced output, or may turn on lights along only two edges for a further reduced output, or may turn on lights along only one edge for a minimal output. Alternatively, the light sources 35 and switches may be configured so that only every second light source may be turned on to provide a reduced amount of light, etc., or the switch may be a rheostat for dimming the light sources. Other configurations of switches and lights may also be provided to vary the light output.

Figure 4B:
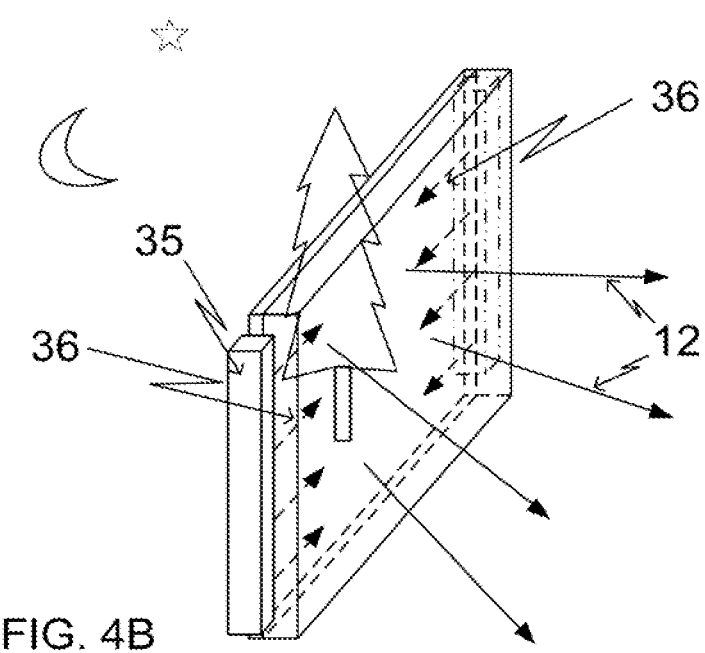

The window 10 may then be placed in a wall with the core material 22 disposed externally and the glass side, which is the artificial light emitting side, disposed towards the interior of the room. With the window 10 placed in this manner, the window may function as a transparent and fully capable window during the day as shown in FIG. 4A, allowing natural sunlight 28 to pass through and illuminate the interior of the room. The window 10 will be essentially fully transparent, and visibility through the window will be possible from both sides. At night, as shown in FIG. 4B, when the natural sunlight 28 is no longer available, or at times during the day when the sunlight may not be sufficient, such as during a rainstorm, the user may choose to switch on light source 35. The artificial light 36 from the edges will then be coupled into the ARROW core material 22 on the window 10, and will in turn be uniformly distributed into the room as artificial light 12.

The window 10 may also be configured as a double, or triple pane window as are common for energy conservation. With such a configuration the ARROW core material 22 may be disposed in the interior space between the panes. This would also provide protection of the ARROW core material from weather, scratches, etc., thereby preserving the integrity of the material for longer life.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An illumination device comprising:
a substrate at least partially transparent and transmissive to light and having a refractive index, $n_s$;
an anti-resonant reflecting optical waveguide structure defining a first surface for being disposed adjacent a first substance having a refractive index, $n_0$, a second surface opposite the first surface and disposed adjacent and in contact with the substrate, and a perimetrical edge; and
at least one light source positioned along at least a portion of the perimetrical edge for entry of light into the waveguide structure via the perimetrical edge,
wherein the waveguide structure comprises:
a core material at least partially transparent and transmissive to light impinging one or more of the first surface and the second surface, the core material comprising:
a first layer defining the first surface, the first layer having an opposing surface opposite the first surface, and a thickness, $d_1$, the first layer comprising a first transparent material having a refractive index, $n_1$, configured to be greater than a refractive index, $n_0$, of an adjacent first substance for total internal reflection at the first surface of the light entering from the perimetrical edge;
a second layer defining the second surface, the second layer having an opposing surface opposite the second surface, and has a thickness, $d_3$, the second layer comprising a second transparent material having a refractive index, $n_3$, less than the refractive index, $n_s$, of the substrate for dispersion of a portion of the light entering from the perimetrical edge through the second surface and into the substrate; and
an anti-resonant layer disposed between the first layer and the second layer in contact with the opposing surfaces of both the first layer and the second layer, the anti-resonant layer having a thickness, $d_2$, and comprising a transparent material layer having a refractive index, $n_2$, greater than the refractive indexes, $n_1$ and $n_3$, of both the first layer and the second layer, and
the core material is configured according to the formulae, $$d_2 \approx \frac{\lambda}{4n_2}\left(1 - \left(\frac{n_1}{n_2}\right)^2 + \left(\frac{\lambda}{2n_2 d_1}\right)^2\right)^{-1/2} \text{ and}$$

$$d_3 \approx \frac{\lambda}{4n_3}\left(1 - \left(\frac{n_1}{n_3}\right)^2 + \left(\frac{\lambda}{2n_3 d_1}\right)^2\right)^{-1/2},$$

where $\lambda$ is a central wavelength of the spectrum of light from the at least one light source, $d_1 > \lambda/n_1$, $n_1$ equals $n_3$ and $d_1$ is approximately $2d_3$.

2. The illumination device of claim 1, wherein the first surface is for being disposed adjacent air, the substrate comprises glass, plastic, lucite, nylon, plexiglass, aluminum oxynitride, sapphire, flint glass, thiourethane plastic, polycarbonate, crown glass, or combinations thereof, and the substrate is a rigid support, a flexible support or a combination thereof.

3. The illumination device of claim 1, wherein:
a ratio of the refractive index of the first layer to a refractive index of an adjacent first substance is about 1.25:1 to about 1.5:1;
a ratio of the refractive index of the second layer to the refractive index of the substrate is about 1:1.2 to about 1:1.4;
a ratio of the refractive index of the anti-resonant layer to the refractive index of the first layer is about 1.2:1 to about 2.1:1; and
a ratio of the refractive index of the anti-resonant layer to the refractive index of the second layer is about 1.2:1 to about 2.1:1.

4. The illumination device of claim 1, wherein:
the first transparent material has a refractive index of about 1.25 to about 1.5;
the second transparent material has a refractive index of about 1.25 to about 1.5; and
the anti-resonance layer comprises a third transparent material having a refractive index of about 1.5 to about 2.6.

5. The illumination device of claim 1, wherein the first transparent material and the second transparent material comprise the same transparent material, and the transparent material has a refractive index of about 1.25 to about 1.5.

6. The illumination device of claim 1, wherein:
the first transparent material comprises a low-index metal composite, a low-index polymer or combinations thereof;
the second transparent material comprises a low-index metal composite, a low-index polymer or combinations thereof; and
the anti-resonance layer comprises a high-index metal oxide, a high-index polymer, or combinations thereof.

7. The illumination device of claim 1, wherein:
the first transparent material and the second transparent material comprise the same transparent material;
the transparent material comprises a fluoropolymer having a refractive index of about 1.25 to about 1.4; and
the fluoropolymer comprises hexafluoropropylene, vinylidene fluoride, perfluoroalkoxy, fluorinated ethylene propylene, or combinations thereof.

8. The illumination device of claim 1, wherein:
the first transparent material and the second transparent material comprise the same transparent material;
the transparent material comprises a fluorinated metal having a refractive index of about 1.37 to about 1.45; and
the fluorinated metal comprises $MgF_2$, $CaF_2$, or combinations thereof.

9. The illumination device of claim 1, wherein the anti-resonance layer comprises a transparent high-index metal oxide having a refractive index from about 1.7 to about 2.6, and the high-index metal oxide comprises $TiO_2$, $HfO_2$, $Ta_2O_5$, $Nb_2O_5$, or combinations thereof.

10. The illumination device of claim 1, wherein the anti-resonance layer comprises a transparent high-index polymer having a refractive index from about 1.6 to about 1.76, and the high-index polymer comprises one or more thiourethane, one or more polythione, one or more polysulfone or combinations thereof.

11. The illumination device of claim 1, wherein the anti-resonance layer comprises a transparent optical polymer having a refractive index from about 1.7 to about 1.76.

12. The illumination device according to claim 1, wherein the light source is selected from a fluorescent bulb, an LED, an OLED, a PLED, a cold-cathode fluorescent light source, a compact fluorescent light source, a halogen bulb, a mercury vapor light source, neon gas light source, a high pressure sodium light source, a sodium vapor light source, a tungsten light source, a carbon arc light source, an electroluminescent light source, a radiofluorescent light source, an incandescent bulb, a laser, a photonic bandgap based light source, a quantum dot based light source, a hydrargyrum medium-arc iodide light source, and combinations thereof.

13. The illumination device of claim 1, wherein the illumination device is configured as one of:
a window pane; and
an illuminated display frame for being disposed over and illuminating one or more of the following: a picture, a display case, a sign, an e-reader, an observation window for a pressure or vacuum chamber, a light source for a magnifying glass, a jeweler loupe, a fresnel lens, spectacles, a borescope, an otoscope, and a peephole.

14. The illumination device of claim 1, wherein for light having $\lambda$ of about 550 nm, $n_3$ and $n_1=1.29$, $n_2=1.76$, $d_1=4$ µm, $d_2=115$ nm and $d_3=2$ µm.

15. A method for using an anti-resonant reflecting optical waveguide structure for illumination of an area, the anti-resonant reflecting optical waveguide structure defining a first surface for being disposed adjacent a first substance having a refractive index, $n_o$, a second surface for being disposed adjacent a substrate having a refractive index, $n_s$, and a perimetrical edge, the anti-resonant reflecting optical waveguide structure comprising a core composition at least partially transparent and transmissive at least to light impinging the first surface, and the method comprising:
selecting at least one light source for providing light to the perimetrical edge, the light having at least a central wavelength, $\lambda$;
selecting a substrate;
configuring the core composition with respect to the first substance and the substrate for entry of light from the additional light source into the core composition via the perimetrical edge and dispersing the light entering from the perimetrical edge outwardly from the second surface, the configuring comprising:
selecting a first core material for defining the first surface, the first core material having a thickness, $d_1$, and being selected to have a refractive index, $n_1$, greater than a refractive index, $n_0$, of an adjacent first substance for total internal reflection at the first surface of light entering from the perimetrical edge;
selecting a second core material for being disposed adjacent the first core material, the second core material having a thickness, $d_2$, and a refractive index, $n_2$, and comprising an anti-resonance layer;
selecting a third core material for being disposed between the substrate and the second core material and defining the second surface, the third core material having a thickness, $d_3$, and being selected to have a refractive index, $n_3$, less than the refractive index, $n_s$, of the substrate for refraction of a portion of the light entering from the perimetrical edge at the second surface and into the substrate;
selecting the second core material comprises selecting the second core material to have a refractive index, $n_2$, greater than the refractive indexes, $n_1$ and $n_3$, of the first and third core materials; and
determining $d_1$, $d_2$, and $d_3$ with the formulae $$d_2 \approx \frac{1\lambda}{4n_2}\left(1-\left(\frac{n_1}{n_2}\right)^2+\left(\frac{\lambda}{2n_2d_1}\right)^2\right)^{-1/2} \text{ and}$$

$$d_3 \approx \frac{1\lambda}{4n_3}\left(1-\left(\frac{n_1}{n_3}\right)^2+\left(\frac{\lambda}{2n_3d_1}\right)^2\right)^{-1/2},$$

where $\lambda$ is a central wavelength of the spectrum of light from the at least one light source, $d_1 > \lambda/n_1$, $n_1$ equals $n_3$, and $d_1$ is approximately $2d_3$;

disposing the anti-resonant reflecting optical waveguide structure with the second surface towards the area to be illuminated;

providing the at least one light source along at least a portion of the perimetrical edge for radiation into the perimetrical edge; and illuminating the area by providing light from the at least one light source into the perimetrical edge and dispersing the light entering from the perimetrical edge outwardly from the second surface into the area to be illuminated.

16. The method of claim 15, further comprising:
configuring the core material with respect to the refractive indexes, $n_o$ and $n_s$, and the central wavelength, $\lambda$, for dispersing the light entering from the perimetrical edge outwardly from substantially only the second surface; and
wherein the illuminating the area by providing light from the at least one light source comprises dispersing of the light entering from the perimetrical edge outwardly from substantially only the second surface into the area to be illuminated.

17. The method of claim 15, wherein the substrate comprises an at least partially transparent support material.

18. The method of claim 15, wherein:
the first substance is air, and the substrate comprises an at least partially transparent support material;
the anti-resonant reflecting optical waveguide structure is configured as a window for illumination of a room;
the disposing of the anti-resonant reflecting optical waveguide structure comprises supporting the structure in a wall with the second surface towards a room to be illuminated; and
the illuminating additionally comprises transmission of light impinging the first surface through the core composition and out via the second surface to the room to be illuminated.

19. The method of claim 18, wherein:
the light impinging the first surface comprises substantially sunlight;
the additional light source comprises an on/off switchable light source;
the illuminating additionally comprises switching on the additional light source to provide light from the second surface into the room; and
the illuminating the area by providing light from the at least one light source comprises dispersing at least about 90% of the light entering from the perimetrical edge outwardly from the second surface into the area to be illuminated.

20. A method for producing an anti-resonant reflecting optical waveguide structure for use in illumination of an area with light of known wavelengths, the anti-resonant reflecting optical waveguide structure comprising a substrate having a refractive index, $n_s$, and a core composition disposed on the substrate, the core composition defining a first surface for being disposed adjacent a first substance having a refractive index, $n_o$, a second surface opposite the first surface and disposed adjacent and in contact with the substrate, and a perimetrical edge, and the method comprising:

selecting the core composition to have at least partial transparency and transmissivity to additional light impinging the first surface, the second surface, or both, the selecting comprising:

selecting a first core material for defining the first surface, the first core material having a thickness, $d_1$, and being selected to have a refractive index, $n_1$, greater than a refractive index, $n_o$, of an adjacent first substance for total internal reflection at the first surface of light entering from the perimetrical edge;

selecting a second core material for being disposed adjacent the first core material, the second core material having a thickness, $d_2$, and a refractive index, $n_2$, and comprising an anti-resonance layer; and selecting a third core material for defining the second surface, the third core material being disposed adjacent the second core material, the third core material having a thickness, $d_3$, and being selected to have a refractive index, $n_3$, less than the refractive index $n_s$, of the substrate for the outward dispersal of light entering from the perimetrical edge into the substrate;

wherein the second core material has a refractive index, $n_2$, greater than the refractive indexes, $n_1$ and $n_3$, of the first and third core materials;

configuring the core composition, with respect to the wavelengths of the light, to receive the light into the core composition via the perimetrical edge and disperse the light entering from the perimetrical edge outwardly from substantially only the second surface, the configuring comprising:

determining a thickness of each of the first core material, the second core material, and the third core material according to the formulae, $$d_2 \approx \frac{1\lambda}{4n_2}\left(1-\left(\frac{n_1}{n_2}\right)^2+\left(\frac{\lambda}{2n_2d_1}\right)^2\right)^{-1/2} \text{ and}$$

$$d_3 \approx \frac{1\lambda}{4n_3}\left(1-\left(\frac{n_1}{n_3}\right)^2+\left(\frac{\lambda}{2n_3d_1}\right)^2\right)^{-1/2}$$

where: $\lambda$ is a central wavelength of the light, and $d_1 > \lambda/n_1$; and forming the waveguide structure from the core composition by:
depositing a layer of thickness, $d_3$, of the third core material on the substrate;
depositing a layer of thickness, $d_2$, of the second core material on the third core material; and
depositing a layer of thickness, $d_1$, of the first core material on the second core material.

21. The method of claim 20, wherein:
selecting the first core material and selecting the third core material comprises selecting the same core material for each of the first core material and the third core material, the core material comprising a material having a refractive index of about 1.25 to about 1.44, and the core material comprising a low-index metal composite, a low-index polymer or combinations thereof; and selecting the second core material comprises selecting a material having a refractive index of about 1.7 to about 2.5, the material comprising a high-index metal oxide, a high-index polymer or combinations thereof.

22. The method of claim 20, wherein:

depositing of the layers comprises depositing by physical vapor deposition, chemical vapor deposition, plasma-enhanced chemical vapor deposition, ion beam sputtering, atomic layer deposition, molecular layer deposition or combinations thereof;

the first core material comprises $MgF_2$, $CaF_2$, or combinations thereof and the first core material has a refractive index of about 1.37 to about 1.44;

the third core material comprises $MgF_2$, $CaF_2$, or combinations thereof and the third core material has a refractive index of about 1.37 to about 1.44;

the second core material comprises $TiO_2$, $HfO_2$, $Ta_2O_5$, $Nb_2O_5$, or combinations thereof and the second core material has a refractive index from about 1.7 to about 2.5;

the first surface is for being disposed adjacent air, and the first core material is selected to have a refractive index, $n_1$, greater than a refractive index, $n_0$, of air;

the substrate comprises glass, plastic, lucite, nylon, plexiglass, aluminum or combinations thereof; and the substrate comprises a rigid support, a flexible support, or combinations thereof.

23. The method of claim 20, wherein:

depositing of the layers comprises depositing the layers by cast-extrusion lamination, multilayer co-extrusion, thermal lamination and combinations thereof;

the first core material comprise hexafluoropropylene, vinylidene fluoride, perfluoroalkoxy, fluorinated ethylene propylene or combinations thereof, and the first core material has a refractive index of about 1.28 to about 1.4;

the third core material comprise hexafluoropropylene, vinylidene fluoride, perfluoroalkoxy, fluorinated ethylene propylene or combinations thereof and the third core material has a refractive index of about 1.28 to about 1.4; and the second core material comprises one or more thiourethane, one or more polythione, one or more polysulfone or combinations thereof, and the third core material has a refractive index from about 1.6 to about 1.76.

* * * * *

UNITED STATES PATENT AND TRADEMARK OFFICE
CERTIFICATE OF CORRECTION

PATENT NO. : 8,668,372 B2  
APPLICATION NO. : 13/640797  
DATED : March 11, 2014  
INVENTOR(S) : Duerksen et al.

Page 1 of 1

It is certified that error appears in the above-identified patent and that said Letters Patent is hereby corrected as shown below:

In the Specification:

In Column 1, Line 18, delete "shortcomings" and insert -- shortcomings. --, therefor.

In the Claims:

In Column 12, Line 64, in Claim 1, delete "equals n₃" and insert -- equals $n_3$, --, therefor.

In Column 14, Line 31, in Claim 15, delete "index, n₀," and insert -- index, $n_0$ --, therefor.

In Column 15, Line 28, in Claim 16, delete "indexes, n₀" and insert -- indexes, $n_0$ --, therefor.

In Column 16, Line 5, in Claim 20, delete "index, n₀," and insert -- index, $n_0$, --, therefor.

In Column 16, Line 27, in Claim 20, delete "index n_s," and insert -- index, $n_s$, --, therefor.

Signed and Sealed this  
First Day of July, 2014

Michelle K. Lee  
*Deputy Director of the United States Patent and Trademark Office*